(12) United States Patent
Takahashi et al.

(10) Patent No.: US 9,960,869 B2
(45) Date of Patent: May 1, 2018

(54) MOBILE STATION AND RADIO BASE STATION

(71) Applicant: NTT DOCOMO, INC., Tokyo (JP)

(72) Inventors: Hideaki Takahashi, Tokyo (JP); Tooru Uchino, Tokyo (JP); Kengo Yagyu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 13 days.

(21) Appl. No.: 14/908,565

(22) PCT Filed: Jul. 28, 2014

(86) PCT No.: PCT/JP2014/069822
§ 371 (c)(1),
(2) Date: Jan. 29, 2016

(87) PCT Pub. No.: WO2015/016177
PCT Pub. Date: Feb. 5, 2015

(65) Prior Publication Data
US 2016/0173214 A1    Jun. 16, 2016

(30) Foreign Application Priority Data

Jul. 30, 2013    (JP) ................................. 2013-157637

(51) Int. Cl.
*H04W 8/22* (2009.01)
*H04L 5/00* (2006.01)
*H04J 1/08* (2006.01)

(52) U.S. Cl.
CPC ................ *H04J 1/08* (2013.01); *H04W 8/22* (2013.01)

(58) Field of Classification Search
CPC .................................. H04L 5/001; H04W 8/22
See application file for complete search history.

(56) References Cited

U.S. PATENT DOCUMENTS

2012/0040687 A1* 2/2012 Siomina ................ G01S 5/0205
455/456.1
2012/0113866 A1* 5/2012 Tenny ................... H04W 24/10
370/254

(Continued)

FOREIGN PATENT DOCUMENTS

GB         2490661 A    11/2012
WO    2012/064780 A1    5/2012

(Continued)

OTHER PUBLICATIONS

International Search Report issued in corresponding application No. PCT/JP2014/069822 dated Oct. 28, 2014 (4 pages).

(Continued)

*Primary Examiner* — Scott M Sciacca
(74) *Attorney, Agent, or Firm* — Osha Liang LLP

(57) ABSTRACT

In CA performed using three or more frequency bands, whether or not a mobile station UE is capable of performing an inter-frequency measurement without a gap is properly determined. The mobile station UE according to the invention includes a transmission unit 11 configured to transmit "UE Capability" indicating a capability of the mobile station UE to a radio base station eNB. The transmission unit 11 is configured to notify frequency bands in which the mobile station UE is capable of performing an inter-frequency measurement without a gap for each "CA band combination" as the "UE Capability".

2 Claims, 6 Drawing Sheets

(56) References Cited

U.S. PATENT DOCUMENTS

| | | | | |
|---|---|---|---|---|
| 2012/0178465 A1* | 7/2012 | Lin | ............... | H04W 24/10 455/450 |
| 2013/0051288 A1* | 2/2013 | Yamada | ............ | H04W 8/24 370/280 |
| 2013/0242796 A1 | 9/2013 | Chen et al. | | |
| 2015/0188793 A1* | 7/2015 | Zhao | ............ | H04W 76/048 370/242 |

FOREIGN PATENT DOCUMENTS

| | | |
|---|---|---|
| WO | 2012/092792 A1 | 7/2012 |
| WO | 2012/094983 A1 | 7/2012 |

OTHER PUBLICATIONS

Written Opinion issued in corresponding application No. PCT/JP2014/069822 dated Oct. 28, 2014 (3 pages).

Alcatel-Lucent et al.; "Measurement gaps handling"; TSG-RAN WG2#72bis, R2-110295; Dublin, Ireland; Jan. 17-21, 2011 (3 pages).

Qualcomm Incorporated; "UE capability for measurement gaps in CA"; 3GPP TSG-RAN WG2 #72bis, R2-110429; Dublin, Ireland; Jan. 17-21, 2011 (3 pages).

3GPP TS 36.331 V11.2.0; "3rd Generation Partnership Project; Technical Specification Group Radio Access Network; Evolved Universal Terrestrial Radio Access (E-UTRA); Radio Resource Control (RRC); Protocol specification (Release 11)"; Dec. 2012 (340 pages).

3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (207 pages).

Extended European Search Report issued in corresponding European Application No. 14832627.5, dated Feb. 23, 2017 (11 pages).

Samsung; "Consideration on UE capability in CA scenario"; 3GPP TSG RAN WG4 Meeting #55, R4-101840; Montreal, Canada; May 10-15, 2010 (4 pages).

Ericsson, ST-Ericsson; "Measurement gap capability signalling for CA"; 3GPP TSG-RAN WG2 #72bis, Tdoc R2-110325; Dublin, Ireland; Jan. 17-21, 2011 (6 pages).

Office Action issued in corresponding Japanese Patent Application No. 2013-157637, dated Jun. 20, 2017 (7 pages).

\* cited by examiner

FIG. 1
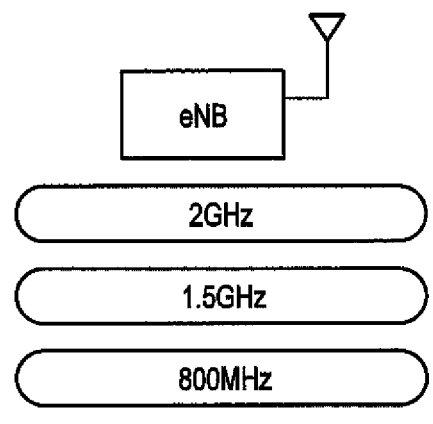
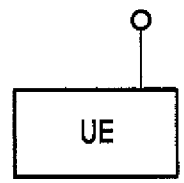
FIG. 2
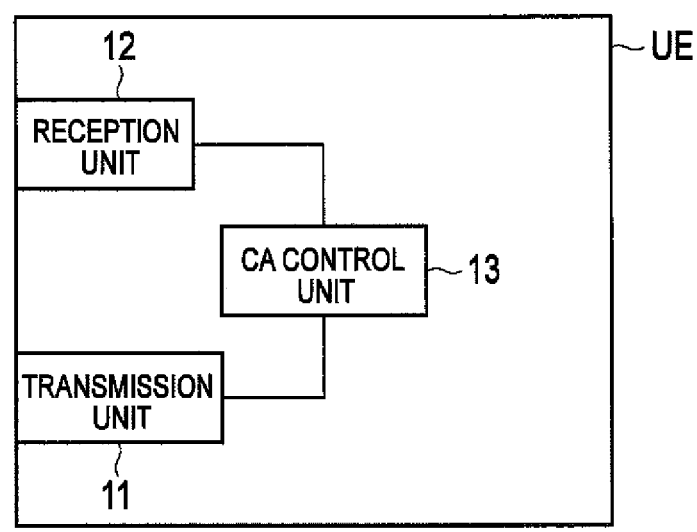

FIG. 3

```
MeasParameters-v12xy ::=      SEQUENCE {
    bandCombinationListEUTRA-r12    BandCombinationListEUTRA-r12
}

BandCombinationListEUTRA-r12 ::=  SEQUENCE (SIZE (1..maxBandComb-r10)) OF
BandInfoEUTRA-r12

BandInfoEUTRA-r12 ::=  SEQUENCE {
    interFreqBandForGapless       FreqBandIndicator       OPTIONAL,
    interFreqBandForGapless1      FreqBandIndicator-v9e0                OPTIONAL
}
```

FIG. 4

```
FreqBandIndicator information element
-- ASN1START
FreqBandIndicator ::=         INTEGER (1..maxFBI)
FreqBandIndicator-v9e0 ::=    INTEGER (maxFBI-Plus1..maxFBI2)
-- ASN1STOP
```

FIG. 6

```
BandCombinationListEUTRA-r10 ::=   SEQUENCE (SIZE (1..maxBandComb-r10)) OF BandInfoEUTRA BandInfoEUTRA ::=    SEQUENCE {
    interFreqBandList    InterFreqBandList,
    interRAT-BandList    InterRAT-BandList    OPTIONAL
}

InterFreqBandList ::=   SEQUENCE (SIZE (1..maxBands)) OF InterFreqBandInfo

InterFreqBandInfo ::=   SEQUENCE {
    interFreqNeedForGaps    BOOLEAN
```

*InterFreqNeedForGaps*
Indicates need for measurement gaps when operating on the E-UTRA band given by the entry in
*bandListEUTRA* or on the E-UTRA band combination given by the entry in *bandCombinationListEUTRA*
and measuring on the E-UTRA band given by the entry in *interFreqBandList*.

MOBILE STATION AND RADIO BASE STATION

TECHNICAL FIELD

The present invention relates to a mobile station and a radio base station.

BACKGROUND ART

In LTE (Long Term Evolution), a mobile station UE capable of interpreting "CA band combination" is configured to transmit an information element "interFreqNeedForGaps" as "UE Capability" to a radio base station eNB, the "interFreqNeedForGaps" indicating whether or not the mobile station UE is capable of performing an Inter-frequency measurement without a gap for each "CA band combination".

For example, when "true" is set in the information element "interFreqNeedForGaps" transmitted by the mobile station UE, and when, in CA (Carrier Aggregation) performed using a frequency band #1 of a 2 GHz band and a frequency band #21 of a 1.5 GHz band, a carrier belonging to the frequency band #1 (or the frequency band #21) is set as a PCC (Primary Component Carrier), the mobile station UE is capable of performing a measurement in the carrier belonging to the frequency band #21 (or the frequency band #1) without a gap.

For example, if the mobile station UE includes multiple radio circuits, and uses the different radio circuits for the respective frequency bands, the mobile station UE is capable of performing the inter-frequency measurement without a gap.

PRIOR ART DOCUMENT

Non-Patent Document

Non-patent document 1: 3GPP TS36.331

SUMMARY OF THE INVENTION

Here, as illustrated in FIG. 7, when a mobile station UE is in a state where "true" is set in an information element "interFreqNeedForGaps" in "CA band combination" corresponding to a combination of a frequency band of an 800 MHz band and a frequency band of a 1.5 GHz band, "true" is set in an information element "interFreqNeedForGaps" in "CA band combination" corresponding to a combination of a frequency band of an 800 MHz band and a frequency band of a 2 GHz band, and "true" is set in an information element "interFreqNeedForGaps" in "CA band combination" corresponding to a combination of a frequency band of a 1.5 GHz band and a frequency band of a 2 GHz band, a radio base station eNB may determine that the mobile station UE is capable of performing an inter-frequency measurement without a gap in CA performed using the frequency band of the 800 MHz band, the frequency band of the 1.5 GHz band, and the frequency band of the 2 GHz band.

However, as illustrated in FIG. 8, when the mobile station UE is in a state where "true" is set in an information element "interFreqNeedForGaps" in "CA band combination" corresponding to a combination of a frequency band of an 800 MHz band and a frequency band of a 1.5 GHz band, "true" is set in an information element "interFreqNeedForGaps" in "CA band combination" corresponding to a combination of a frequency band of an 800 MHz band and a frequency band of a 2 GHz band, and "false" is set in an information element "interFreqNeedForGaps" in "CA band combination" corresponding to a combination of a frequency band of a 1.5 GHz band and a frequency band of a 2 GHz band, there is a problem that a radio base station eNB does not know how to determine whether or not the mobile station UE is capable of performing an inter-frequency measurement without a gap in CA performed using the frequency band of the 800 MHz band, the frequency band of the 1.5 GHz band, and the frequency band of the 2 GHz band.

Hence, the invention has been made in view of the above problems, and accordingly has an objective to provide a mobile station and a radio base station which make it possible to properly determine whether or not the mobile station UE is capable of performing an inter-frequency measurement without a gap in CA performed using three or more frequency bands.

A first feature of the present invention is summarized as a mobile station comprising: a transmission unit configured to transmit capability information indicating a capability of the mobile station to a radio base station, wherein the transmission unit notifies a frequency band in which the mobile station is capable of performing an inter-frequency measurement without a gap for each combination of two or more frequency bands as the capability information.

A second feature of the present invention is summarized as a radio base station comprising: a carrier aggregation control unit configured to control carrier aggregation of a mobile station; and a reception unit configured to receive an information element as capability information indicating a capability of the mobile station from the mobile station, the information element indicating a frequency band in which the mobile station is capable of performing an inter-frequency measurement without a gap for each combination of two or more frequency bands, wherein the carrier aggregation control unit determines based on the information element whether or not the mobile station is capable of performing an inter-frequency measurement without a gap in carrier aggregation performed using three or more frequency bands.

A third feature of the present invention is summarized as a radio base station comprising: a carrier aggregation control unit configured to control carrier aggregation of a mobile station; and a reception unit configured to receive an information element as capability information indicating a capability of the mobile station from the mobile station, the information element indicating whether or not the mobile station is capable of performing an inter-frequency measurement without a gap for each combination of two frequency bands, wherein when the information element indicates that an inter-frequency measurement is performable without a gap in all combinations of two frequency bands among three or more frequency bands, the carrier aggregation control unit determines that the mobile station is capable of performing an inter-frequency measurement without a gap in carrier aggregation performed using the three or more frequency bands.

A fourth feature of the present invention is summarized as a radio base station comprising: a carrier aggregation control unit configured to control carrier aggregation of a mobile station; and a reception unit configured to receive an information element as capability information of the mobile station from the mobile station, the information element indicating whether or not the mobile station is capable of performing an inter-frequency measurement without a gap for each combination of two frequency bands, wherein when the information element indicates that the mobile station is capable of performing an inter-frequency measurement without a gap in all combinations of a frequency band including a primary component carrier and a frequency band including a secondary component carrier among three or more frequency bands, the carrier aggregation control unit determines that the mobile station is capable of performing an inter-frequency measurement without a gap in carrier aggregation performed using the three or more frequency bands.

BRIEF DESCRIPTION OF THE DRAWINGS

FIG. 1 is an overall configuration diagram of a mobile communication system according to a first embodiment of the invention.

FIG. 2 is a functional block diagram of a mobile station according to the first embodiment of the invention.

FIG. 3 illustrates an example of a format of an information element "MeasParameters-v12xy" which is transmitted by the mobile station according to the first embodiment of the invention.

FIG. 4 illustrates an example of a format of an information element "FreqBandIndicator" in the information element "MeasParameters-v12xy" which is transmitted by the mobile station according to the first embodiment of the invention.

FIG. 6 is a diagram for illustrating an example of a format of an information element "BandCombinationListEUTRA-r10" which is transmitted by a mobile station according to a second embodiment of the invention.

MODES FOR CARRYING OUT THE INVENTION

Mobile Communication System According to First Embodiment of the Invention

A mobile communication system according to a first embodiment of the invention is described by referring to FIG. 1 to FIG. 5. In the embodiment, an LTE mobile communication system is described as an example of a mobile communication system according to the embodiment. However, the invention is also applicable to a mobile communication system other than the LTE.

As illustrated in FIG. 1, in the mobile communication system according to the embodiment, a radio base station eNB manages a cell in which a carrier belonging to a frequency band of an 800 MHz band is used, a cell in which a carrier belonging to a frequency band of a 1.5 GHz band is used, and a cell in which a carrier belonging to a frequency band of a 2 GHz band is used.

In addition, the mobile station UE and the radio base station eNB are configured to be capable of performing CA using the frequency band of the 800 MHz band, the frequency band of the 1.5 GHz band, and the frequency band of the 2 GHz band.

In other words, the mobile station UE and the radio base station eNB are configured to be capable of performing the CA using the carrier belonging to the frequency band of the 800 MHz band, the carrier belonging to the frequency band of the 1.5 GHz band, and the carrier belonging to the frequency band of the 2 GHz band.

As illustrated in FIG. 2, the mobile station UE includes a transmission unit 11, a reception unit 12, and a CA control unit 13.

The transmission unit 11 is configured to transmit various kinds of signals to the radio base station eNB. The reception unit 12 is configured to receive various kinds of signals from the radio base station eNB.

For example, the transmission unit 11 is configured to transmit "UE Capability" indicating a capability of the mobile station UE to the radio base station eNB.

Here, the transmission unit 11 is configured to notify as the "UE Capability", frequency bands in which an inter-frequency measurement is performable without a gap, for each combination of two frequency bands by "CA band combination".

For example, as illustrated in FIG. 3 and FIG. 4, the transmission unit 11 may be configured to notify a frequency band, in which the inter-frequency measurement is performable without a gap, for each combination of the two frequency bands to be used in CA by information elements "FreqBandIndicator" and "FreqBandIndicator-v9e0" in an information element "BandInforEUTRA-r12" in an information element "BandCombinationListEUTRA-r12" in an information element "MeasParameters-v12xy" which is transmitted by the "UE Capability".

Figure 7:
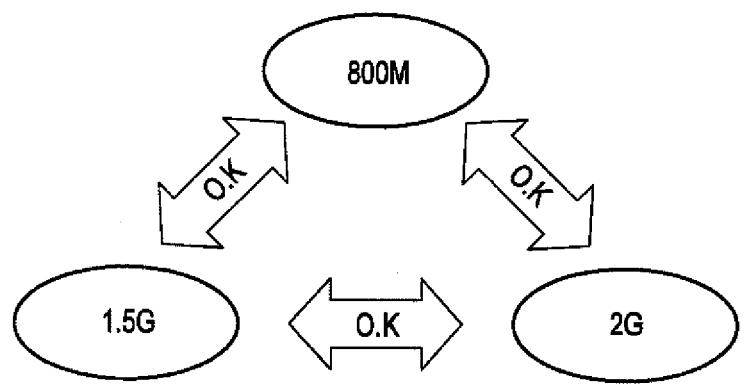
FIG. 7 is a diagram for illustrating a configuration example (No. 1) of "interFreqNeedForGaps".
Figure 8:
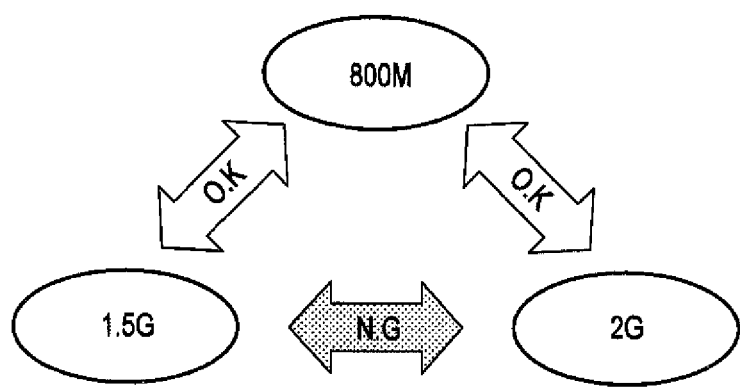
FIG. 8 is a diagram for illustrating a configuration example (No. 2) of "interFreqNeedForGaps".

For example, in a case illustrated in FIG. 7, the transmission unit 11 may be configured to notify a frequency band of an 800 MHz band and a frequency band of a 3.5 GHz band as a frequency band in which the inter-frequency measurement is performable without a gap, by the information element "FreqBandindicator" (and "FreqBandIndicator-v9e0") in the "CA band combination" which corresponds to the combination of the frequency band of the 2 GHz band and the frequency band of the 1.5 GHz band.

In addition, the CA control unit 13 is configured to control the CA performed by the mobile station UE.

Figure 5:
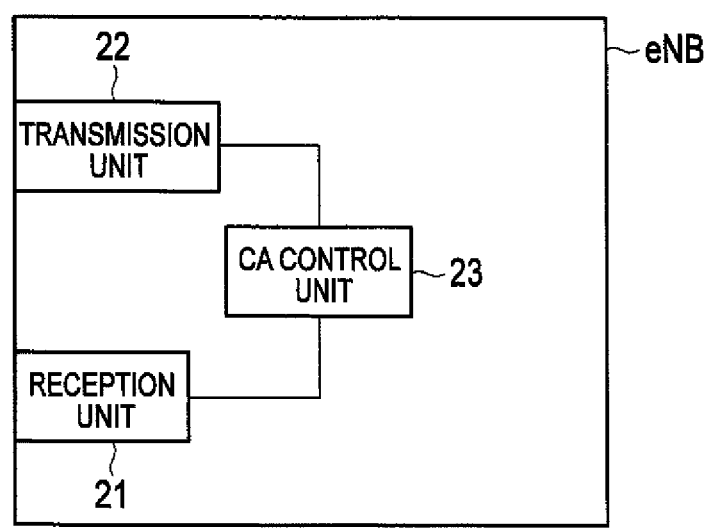
FIG. 5 is a functional block diagram of a radio base station according to the first embodiment of the invention.

As illustrated in FIG. 5, the radio base station eNB includes a reception unit 21, a transmission unit 22, and a CA control unit 23.

The reception unit 21 is configured to receive various kinds of signals from the mobile station UE. The transmission unit 22 is configured to transmit various kinds of signals to the mobile station UE.

For example, the reception unit 21 is configured to receive "UE Capability" indicating a capability of the mobile station UE from the mobile station UE.

Here, the reception unit 21 is configured to receive information elements "FreqBandIndicator" and "FreqBandIndicator-v9e0" as the "UE Capability", which indicate frequency bands in which the inter-frequency measurement is performable without a gap, for each "CA band combination".

In addition, the CA control unit 23 is configured to control the CA of the mobile station UE.

Specifically, the CA control unit 23 is configured to determine based on the information elements "FreqBandIndicator" and "FreqBandIndicator-v9e0" which are received by the reception unit 21 whether or not the mobile station UE is capable of performing the inter-frequency measurement without a gap in the CA performed using three or more frequency bands.

For example, the CA control unit 23 may be configured to determine that the mobile station UE is capable of performing the inter-frequency measurement without a gap in the CA performed using the frequency band of the 2 GHz band, the frequency band of the 1.5 GHz band, and the frequency band of the 800 MHz band, when the information element "FreqBandIndicator" (and "FreqBandIndicator-v9e0") in the "CA band combination" corresponding to the combination of the frequency band of the 2 GHz band and the frequency band of the 1.5 GHz band notifies the frequency band of the 800 MHz band and the frequency band of the 3.5 GHz band as the frequency bands in which the inter-frequency measurement is performable without a gap.

In other words, the CA control unit 23 may be configured to determine that the mobile station UE is capable of performing the inter-frequency measurement without a gap in the CA performed using the three or more frequency bands, in a case where the CA is performed using three or more frequency bands when the information element "FreqBandIndicator" (and "FreqBandIndicator-v9e0") for the combination of two of the three or more frequency bands notifies all the rest of the three or more frequency bands as the frequency bands in which the inter-frequency measurement is performable without a gap.

On the other hand, the CA control unit 23 may be configured to determine that the mobile station UE is incapable of performing the inter-frequency measurement without a gap in the CA performed using the frequency band of the 2 GHz band, the frequency band of the 1.5 GHz band, and the frequency band of the 800 MHz band, when the information element "FreqBandIndicator" (and "FreqBandIndicator-v9e0") in the "CA band combination" corresponding to the combination of the frequency band of the 2 GHz band and the frequency band of the 1.5 GHz band does not notify the frequency band of the 800 MHz band as the frequency band in which the inter-frequency measurement is performable without a gap.

Note that, the CA control unit 23 is configured to determine a method of measurement processing performed by the mobile station UE based on the above-described determination result. The transmission unit 21 is configured to notify the mobile station UE of the determination result.

The foregoing features of the present embodiment may be expressed as follows.

In summary, a first feature of the present embodiment is a mobile station UE comprising: a transmission unit 11 configured to transmit "UE Capability (capability information)" indicating a capability of the mobile station UE to a radio base station eNB, wherein the transmission unit 11 notifies a frequency band in which the mobile station UE is capable of performing an inter-frequency measurement without a gap for each "CA band combination (combination of two frequency bands)" as the "UE Capability".

In summary, a second feature of the present embodiment is a radio base station eNB comprising: a CA control unit 23 configured to control CA of a mobile station UE; and a reception unit configured to receive information elements "FreqBandIndicator" and "FreqBandIndicator-v9e0" as "UE Capability" from the mobile station UE, the information elements indicating a frequency band in which the mobile station UE is capable of performing an inter-frequency measurement without a gap for each "CA band combination", wherein the CA control unit 23 determines, based on the information elements "FreqBandIndicator" and "FreqBandIndicator-v9e0", whether or not the mobile station UE is capable of performing an inter-frequency measurement without a gap in CA performed using three or more frequency bands.

According to the above-described features, based on the information elements "FreqBandIndicator" and "FreqBandIndicator-v9e0" which are notified by the mobile station UE, the radio base station eNB is capable of properly determining whether or not the mobile station UE is capable of performing the inter-frequency measurement without a gap in the CA performed using three or more frequency bands.

Mobile Communication System According to Second Embodiment

Hereinafter, a mobile communication system according to a second embodiment of the invention is described by paying attention to differences with the mobile communication system according to the first embodiment.

A transmission unit 11 of a mobile station UE is configured to transmit an information element "InterFreqBandInfo (interFreqNeedForGaps)" as "UE Capability", which indicates whether or not an inter-frequency measurement is performable without a gap for each "CA band combination".

For example, as illustrated in FIG. 6, the transmission unit 11 may be configured to notify whether or not an inter-frequency measurement is performable without a gap for each combination of two frequency bands which is used in CA by an information element "InterFreqBandInfo (interFreqNeedForGaps)" in an information element "InterFreqBandList" in an information element "BandInforEUTRA" in an information element "BandCombinationListEUTRA-r10" which is transmitted by the "UE Capability".

A CA control unit 23 of a radio base station eNB is configured to determine that the mobile station UE is capable of performing the inter-frequency measurement without a gap in CA performed using the three or more frequency bands, when the information element "InterFreqBandInfo (interFreqNeedForGaps)" indicates that the inter-frequency measurement is performable without a gap in all the combinations of the two frequency bands among three or more frequency bands.

For example, the CA control unit 23 of the radio base station eNB is configured such that in a case where CA is performed using a frequency band of a 2 GHz band, a frequency band of a 1.5 GHz band, and a frequency band of an 800 MHz band, when an information element "InterFreqBandinfo (InterFreqNeedForGaps)" indicates that an inter-frequency measurement is performable without a gap in all combinations of two frequency bands among three or more frequency bands, in other words, all of the combinations such as the combination of the frequency band of the 2 GHz band and the frequency band of the 1.5 GHz band, the combination of the frequency band of the 2 GHz band and the frequency band of the 800 MHz band, and the combination of the frequency band of the 1.5 GHz band and the frequency band of the 800 MHz band, the CA control unit 23 of the radio base station eNB determines that the mobile station UE is capable of performing the inter-frequency measurement without a gap in CA performed using the three or more frequency bands (CA performed using the frequency band of the 2 GHz band, the frequency band of the 1.5 GHz band, and the frequency band of the 800 MHz band).

On the other hand, the CA control unit 23 of the radio base station eNB is configured such that in a case where CA is performed using the frequency band of the 2 GHz band, the frequency band of the 1.5 GHz band, and the frequency band of the 800 MHz band, when an information element "InterFreqBandInfo (interFreqNeedForGaps)" indicates that an inter-frequency measurement is not performable in at least one combination of the frequency bands among the three or more frequency bands, in other words, at least one of the combination of the frequency band of the 2 GHz band and the frequency band of the 1.5 GHz band, the combination of the frequency band of the 2 GHz band and the 800 MHz band, and the combination of the frequency band of the 1.5 GHz band and the frequency band of the 800 MHz band, the CA control unit 23 of the radio base station eNB determines that the mobile station UE is incapable of performing the inter-frequency measurement without a gap in CA performed using the three or more frequency bands (CA performed using the frequency band of the 2 GHz band, the frequency band of the 1.5 GHz band, and the frequency band of the 800 MHz band).

Note that, the CA control unit 23 may be configured such that when the information element "InterFreqBandInfo (interFreqNeedForGaps)" indicates that the inter-frequency measurement is performable without a gap in all the combinations of the frequency band including PCC and the frequency band including SCC among the three or more frequency bands, the CA control unit 23 determines that the mobile station UE is capable of performing the inter-frequency measurement without a gap in CA performed using the three or more frequency bands.

For example, the CA control unit 23 of the radio base station eNB may be configured such that if it is assumed that PCC belongs to the frequency band of the 2 GHz band in a case where CA is performed using the frequency band of the 2 GHz band, the frequency band of the 1.5 GHz band, and the frequency band of the 800 MHz band, when the information element "InterFreqBandInfo (interFreqNeedForGaps)" indicates that the inter-frequency measurement is performable without a gap in all the combinations of the frequency band including PCC and the frequency band including SCC among the three or more frequency bands, in other words, in all of the combination of the frequency band of the 2 GHz band and the frequency band of the 1.5 GHz band and the combination of the frequency band of the 2 GHz band and the frequency band of the 800 MHz band, the CA control unit 23 of the radio base station eNB determines that the mobile station UE is capable of performing the inter-frequency measurement without a gap in CA performed using the three or more frequency bands (CA performed using the frequency band of the 2 GHz band, the frequency band of the 1.5 GHz band, and the frequency band of the 800 MHz band).

In other words, the CA control unit 23 of the radio base station eNB may be configured such that, in such a case, even when the information element "InterFreqBandInfo (interFreqNeedForGaps)" indicates that the inter-frequency measurement is not performable without a gap in the combination of the frequency band of the 1.5 GHz band and the frequency band of the 800 MHz band, the CA control unit 23 of the radio base station eNB determines that the mobile station UE is capable of performing the inter-frequency measurement without a gap in CA performed using the three or more frequency bands (CA performed using the frequency band of the 2 GHz band, the frequency band of the 1.5 GHz band, and the frequency band of the 800 MHz band).

On the other hand, the CA control unit 23 of the radio base station eNB may be configured such that if it is assumed that PCC belongs to the frequency band of the 2 GHz band in a case where CA is performed using the frequency band of the 2 GHz band, the frequency band of the 1.5 GHz band, and the frequency band of the 800 MHz band, when the information element "InterFreqBandInfo (interFreqNeedForGaps)" indicates that the inter-frequency measurement is not performable in at least one combination of the frequency band including PCC and the frequency band including SCC among the three or more frequency bands, in other words, in at least one of the combination of the frequency band of the 2 GHz band and the frequency band of the 1.5 GHz band and the combination of the frequency band of the 2 GHz band and the 800 MHz band, the CA control unit 23 of the radio base station eNB determines that the mobile station UE is incapable of performing the inter-frequency measurement without a gap in CA performed using the three or more frequency bands (CA performed using the frequency band of the 2 GHz band, the frequency band of the 1.5 GHz band, and the frequency band of the 800 MHz band).

The foregoing features of the present embodiment may be expressed as follows.

In summary, a first feature of the present embodiment is a radio base station eNB comprising: a CA control unit 23 configured to control CA of a mobile station UE; and a reception unit 21 configured to receive an information element "InterFreqBandInfo (interFreqNeedForGaps)" as "UE Capability" from the mobile station UE, the information element indicating whether or not the mobile station is capable of performing an inter-frequency measurement without a gap for each "CA band combination", wherein when the information element "InterFreqBandInfo (interFreqNeedForGaps)" indicates that an inter-frequency measurement is performable without a gap in all combinations of two frequency bands among three or more frequency bands, the CA control unit 23 determines that the mobile station UE is capable of performing an inter-frequency measurement without a gap in CA performed using the three or more frequency bands.

According to the feature, the radio base station eNB may properly determine whether or not the mobile station UE is capable of performing the inter-frequency measurement without a gap by utilizing the existing signaling in CA performed using the three or more frequency bands.

In summary, a second feature of the present embodiment is a radio base station eNB comprising: a carrier aggregation control unit 23 configured to control CA of a mobile station UE; and a reception unit 21 configured to receive an information element "InterFreqBandInfo (interFreqNeedForGaps)" as "UE Capability" from the mobile station UE, the information element indicating whether or not the mobile station is capable of performing an inter-frequency measurement without a gap for each "CA band combination", wherein when the information element "InterFreqBandInfo (interFreqNeedForGaps)" indicates that the mobile station is capable of performing an inter-frequency measurement without a gap in all combinations of a frequency band including a PCC and a frequency band including an SCC among three or more frequency bands, the CA control unit 23 determines that the mobile station UE is capable of performing an inter-frequency measurement without a gap in CA performed using the three or more frequency bands.

According to the feature, in CA performed using the three or more frequency bands, the radio base station eNB may properly determine whether or not the mobile station UE is capable of performing the inter-frequency measurement without a gap by utilizing the existing signaling and considering the CA characteristics.

(Modification 1)

It is assumed in the mobile communication systems according to the first and second embodiments that a mobile station UE is configured to notify a frequency band in which an inter-frequency measurement is performable without a gap for each combination of two frequency bands by "CA band combination", provided that CA is performed using CC within two frequency bands in accordance with the current LTE regulations. However, in this modification 1, a mobile station UE may be configured to notify a frequency band in which an inter-frequency measurement is performable without a gap for each combination of two or more frequency bands by "CA band combination", provided that CA is performed using CC within two or more frequency bands in future LTE.

It should be noted that the foregoing operations of the radio base station eNB and the mobile station UE may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the radio base station eNB or the mobile station UE. Otherwise, the storage medium and the processor may be provided as discrete components inside the radio base station eNB or the mobile station UE. Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2013-157637 (filed on Jul. 30, 2013) is incorporated by reference in the present specification.

INDUSTRIAL APPLICABILITY

As described above, the invention may provide a mobile station and a radio base station, which are capable of properly determining whether or not a mobile station UE is capable of performing an inter-frequency measurement without a gap in CA performed using three or more frequency bands.

EXPLANATION OF REFERENCE NUMERALS eNB Radio base station
UE Mobile station
11,22 Transmission unit
12,21 Reception unit
13,23 CA control unit

The invention claimed is:
1. A radio base station, comprising:
a processor that controls carrier aggregation of a mobile station; and
a receiver that receives an information element as capability information indicating a capability of the mobile station from the mobile station, the information element indicating whether or not the mobile station is capable of performing an inter-frequency measurement without a gap for each combination of two frequency bands, wherein
when the information element indicates that an inter-frequency measurement is performable without a gap in all combinations of two frequency bands among three or more frequency bands, the processor determines that the mobile station is capable of performing an inter-frequency measurement without a gap in carrier aggregation performed using the three or more frequency bands, and
the three or more frequency bands include an 800 MHz band, a 1.5 GHz band and a 2 GHz band.
2. A radio base station, comprising:
a processor that controls carrier aggregation of a mobile station; and
a receiver that receives an information element as capability information of the mobile station from the mobile station, the information element indicating whether or not the mobile station is capable of performing an inter-frequency measurement without a gap for each combination of two frequency bands, wherein
when the information element indicates that the mobile station is capable of performing an inter-frequency measurement without a gap in all combinations of a frequency band including a primary component carrier and a frequency band including a secondary component carrier among three or more frequency bands, the processor determines that the mobile station is capable of performing an inter-frequency measurement without a gap in carrier aggregation performed using the three or more frequency bands, and
the three or more frequency bands include an 800 MHz band, a 1.5 GHz band and a 2 GHz band.

* * * * *